J. HORVATH.
FILLER CAP AND LUBRICATOR.
APPLICATION FILED MAR. 12, 1917. RENEWED JUNE 20, 1918.
1,290,999. Patented Jan. 14, 1919.
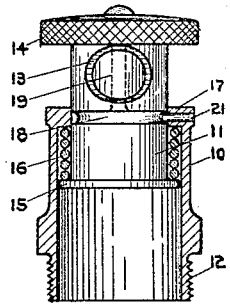
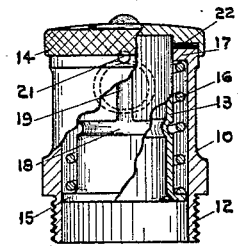
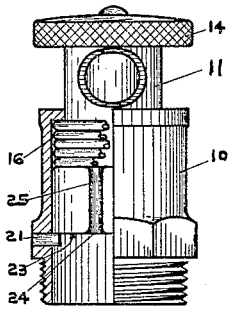
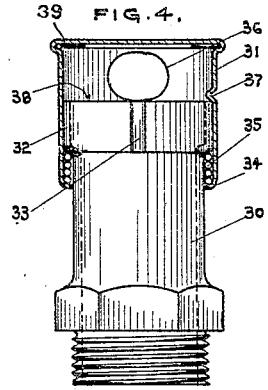
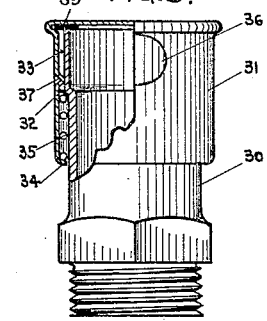
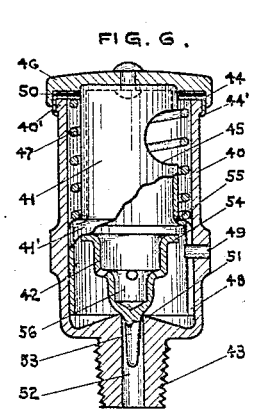
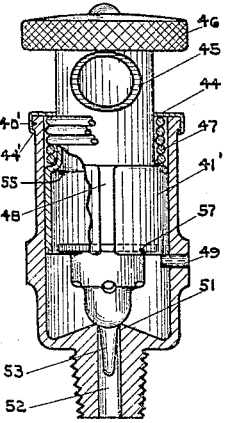
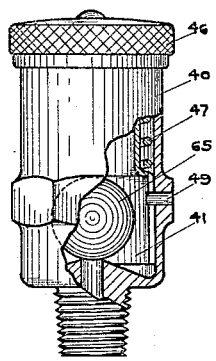
Witnesses.
Andrew J. Matteson
Mrs Emily Matteson
INVENTOR
Joseph Horvath.
BY
Pagelsen and Spencer.
ATTORNEYS.

UNITED STATES PATENT OFFICE.

JOSEPH HORVATH, OF DETROIT, MICHIGAN.

FILLER-CAP AND LUBRICATOR.

1,290,999.  Specification of Letters Patent.  Patented Jan. 14, 1919.

Application filed March 12, 1917, Serial No. 154,093. Renewed June 20, 1918. Serial No. 241,096.

*To all whom it may concern:*

Be it known that I, JOSEPH HORVATH, a subject of the Emperor of Austria-Hungary, and residing at Detroit, in the county of Wayne and State of Michigan, have invented a new and Improved Filler-Cap and Lubricator, of which the following is a specification.

My invention relates to automatic lubricators especially adapted for automobiles and the engines thereof, and to self closing filler caps for such lubricators and for such other containers as may require a filling device that can be locked with its liquid receiving aperture fully open against the tension of a spring.

One object of this invention is to provide a lubricator which will discharge no lubricant so long as it is at rest but will begin such discharge as soon as the machine upon which it is mounted begins to tremble and shake.

Another object of this invention is to provide a valve within the lubricator to normally close the discharge passage therein, which valve will sway or roll sidewise when the device is shaken to partially uncover the discharge passage and thus permit the escape of a portion of the lubricant.

A further object of this invention is to provide one cylindrical member slidable relative to a stationary member concentric therewith, the movable member being formed with an aperture through which lubricant may be introduced into the device, one of these members being formed with a shoulder against which a projection on the other member rests while the said aperture is open, and to provide a spring for so holding these members relative to each other that said aperture in the one member will be covered by the other member when this is desired.

While this lubricator is especially adapted for the spring shackles, propeller shaft bearings and steering mechanism of motor vehicles wherein the various parts to be lubricated are subject to jars and shocks sufficient to move the valve from its seat, it is equally useful in connection with any other machinery within similar movements may be imparted to the valve.

In the accompanying drawing, Figure 1 is a central vertical section of the outer stationary member or body of the filler portion of this invention, the inner movable portion being in elevation and in filling position. Fig. 2 is an elevation of this device in closed position, portions being broken away to show the interior of the parts. Fig. 3 is an elevation of a modified form of filler cap, a portion of the body being broken away. Figs. 4 and 5 are views of another modified form of filler cap in open and closed positions. Figs. 6 and 7 are views of a filler cap substantially as shown in Fig. 3 combined with a valve mechanism to control the discharge of the lubricant. Fig. 8 is a modified form of this lubricator.

Similar reference characters refer to like parts throughout the several views.

The devices shown in Figs. 1 to 5 are filler caps which may be employed in connection with lubricators of any desired character or with any other receptacles to which liquids are to be conducted. In every case, a stationary member or body is designed to receive the liquid which is introduced through a filler opening in the movable member. In each case, a spring is provided to move one member relative to the other and to cause the stationary member to close a filler opening in the movable member. In each case, one of the members is formed with a circumferential shoulder against which a projection on the other member may engage to hold the movable member in such position that the filler opening is unobstructed, and the member thus formed with a shoulder is also formed with a groove extending longitudinally from the shoulder in which the projection may travel when the spring forces the movable member to the position where such opening shall be closed.

The devices which are shown in Figs. 1 to 5 inclusive vary in most of their details and my invention is therefore not limited to any of these details or to the proportions of the various parts. In Figs. 1 and 2 the cylindrical outer member or body 10 may be formed with a threaded lower end 12 and with an inwardly projecting flange 17 at its upper end. The inner movable member or plunger 11 is provided with a flange 15 at its lower end, between which and the flange 17 is a spring 16 which normally holds the parts in the positions shown in Fig. 2. The plunger is formed with a filler opening 13, a circumferential groove 18, and a longitudinal groove 19 that connects therewith. A flange or cap 14 on the upper end of the plunger may be knurled to assist in the turning of it. A pin 21 mounted in the flange 17 is slidable in the grooves 18 and 19.

When the parts are to be set to receive the lubricant, the plunger 11 is lifted until the pin 21 reaches the groove 18, whereupon the plunger is turned to bring this pin below the circumferential shoulder forming the upper wall of this groove. The aperture 13 is fully open and lubricant or other liquid may be introduced as desired. When the plunger is turned until the pin 21 reaches the groove 19 and then released, the spring 16 will force the parts to the positions shown in Fig. 2, when the opening 13 will be closed. A washer 22 of any desirable material then serves as a packing ring to prevent the escape of the lubricant which may splash up within the plunger and through the opening 13. This device may be employed as a filler cap for automobile radiators and gasolene tanks.

In Fig. 3, the outer casing or body 10 is substantially the same as in Figs. 1 and 2, but the plunger is of two diameters, the larger and lower portion 24 being provided with a longitudinal groove 25. The same head or cap 14 may be connected to the upper end of the smaller portion 22 of the plunger. The pin 21 is mounted at a lower point than in Figs. 1 and 2 and engages the shoulder 23 constituted by the lower edge of the hollow plunger. The operation of this device is substantially the same as that shown in Figs. 1 and 2.

While the movable member is a plunger within a casing or body in Figs. 1, 2 and 3, the movable member in Figs. 4 and 5 is a sleeve that is slidable on the body. The body 30 has an upper end 32 of larger diameter provided with a longitudinal groove 33. The cap 31 has its upper end closed and is provided with a filler opening 36 and an inwardly extending flange 34, formed preferably by bending in the lower edge of the cap. A spring 35 is mounted between the lower edge of the part 32 of the stationary member and the flange 34 on the cap. A projection 37 may be formed on the cap and is slidable in the groove 33, but when the cap is elevated to uncover the opening 36, the cap may be turned so that this projection will rest on the shoulder 38 constituted by the upper edge of the part 32 of the body. When the parts are held in the position shown in Fig. 5, leakage around the upper edge of the part 32 may be prevented by the thin washer 39 shown next to the head of the cap.

By forming a bottom on the stationary members shown in Figs. 1 to 5 inclusive and providing this bottom with a discharge passage controlled by a valve, a lubricator of great excellence is obtained. In Figs. 6, 7 and 8, the body 40, and the plunger 41 having an enlarged lower portion 41' slidably fitting within the body 40 and provided with the filler opening 45 and the cap 46, are much the same as similar parts shown in Fig. 3, excepting that the body has a closed lower end provided with a threaded hub 43 having a discharge passage 52. A collar 44 of sheet metal may be secured to the upper end of the body 40 by bending the flange 44' of the collar around the bead 40' on the body. This collar serves as an abutment for the spring 47 that also bears against the shoulder formed by the upper end of the lower enlarged portion of the plunger. A cap 46 may be secured to the plunger and a packing ring 50 may prevent leakage between this cap and the collar 44. A pin 49 is adapted to slide in the groove or slot 48 in the plunger and to engage the shoulder 57 at the lower end of the plunger.

Mounted within the body is a valve 42 resting on the valve seat 51 at the upper end of the passage 52 and having an extension 53 projecting into this passage to center the valve. The lubricant will flow down into and through this valve, sediment being retained in the chamber 56.

The lubricator is filled through the opening 45 when the plunger is elevated to the position shown in Fig. 7, being held in that position by the pin 49. After the lubricator is filled, the cap 46 is turned until the pin 49 reaches the groove 48, after which the parts will be moved to the position shown in Fig. 6. As soon as the machinery is set in motion, the shaking and jars thereof will slightly unseat the valve 42 and permit a slight leakage into the passage 52. While the machinery is stationary, the valve will remain on its seat and prevent all escape of the lubricant. The flange 54 at the upper edge of the valve will be of smaller diameter than the interior of the part 41' of the plunger, the difference in these diameters determining the extent of movement of the valve.

Instead of the valve shown in Figs. 6 and 7, a ball valve 65 may be employed, this valve rolling slightly as the body 40 vibrates and permitting the lubricant to escape. The movements of the valves will increase and decrease in substantially the same ratio as similar movements of the machinery on which these lubricators are mounted and such movements will depend greatly upon the speed of the machinery, so that the feed of the lubricant will be substantially proportioned to the demand therefor.

I claim :—

1. The combination of a cylindrical stationary body and a plunger formed of two cylinders of different diameters slidable therein provided with a filling aperture near its upper end and a longitudinal groove ending at its lower end at a circumferential shoulder, said body having an inwardly extending flange at its upper end and an inwardly projecting pin adapted to project into said groove and below said shoulder of the plunger, and a coil spring mounted on the plunger between said flange on the body and the larger portion of the plunger.

2. The combination of a cylindrical body and a cylindrical plunger therein and formed with a filler aperture, a longitudinal groove and a circumferential shoulder, a spring mounted between the plunger and body to hold the plunger in aperture-closing position, and a projection on the body slidable in said groove and adapted to engage the shoulder to hold the plunger against the force of the spring.

3. The combination of a cylindrical body and a cylindrical plunger therein and formed with a filler aperture, a longitudinal groove and a circumferential shoulder, a spring mounted between the plunger and body to hold the plunger in aperture-closing position, a projection on the body slidable in said groove and adapted to engage the shoulder to hold the plunger against the force of the spring, a cap on the upper end of the plunger, and a packing ring mounted beneath the cap and adapted to engage the upper end of the body to prevent leakage.

4. The combination of a hollow interior and exterior members, one within the other, one of said members having an internal flange and the other an external ridge, a compression coil spring between the flange and ridge, one of said members having a longitudinal groove and a circumferential shoulder at one end of the groove, and a projection on the other member slidable in said groove.

5. In an automatic lubricator, the combination of an outer stationary member provided with a rim, having a projecting lock pin, of an inner movable member or plunger having a rim on its lower end and provided with a horizontal circular locking groove and with a groove extending lengthwise of the plunger, said grooves coöperating with the guide pin of said outer member whereby when said plunger is moved outwardly it may be locked in its outer position, a retracting spring interposed between the rim of the outer member and the rim of the plunger adapted to move the plunger to its inner position and a valve mounted within the plunger.

6. In an automatic lubricator, the combination of an outer stationary member having an inwardly projecting pin, an inner hollow member or plunger provided with a transverse locking groove and with a longitudinal groove, said grooves coöperating with the lock pin whereby when said plunger is moved outwardly may be locked in its outer position, said plunger provided with an aperture to receive the oil when raised, said stationary member terminating on its lower inner end with a valve seat provided with a channel, a valve for engaging in said seat, said valve normally closing said channel under the influence of gravity and movable to open position under the shock and jar of the car or engine to which it is attached, and a retracting spring adapted to move the plunger to its inner position.

7. In an automatic lubricator, the combination of a stationary member provided with an inwardly extending rim and an inwardly projecting pin, of an inner movable member or plunger having an enlarged lower end and a longitudinal groove adapted to receive the pin whereby said plunger is guided in its movement, a spring interposed between the rim on the outer member and the enlarged lower portion of the plunger to move the plunger to normal position, said plunger being formed with a shoulder at the lower end of said groove which shoulder is adapted to be engaged by the pin to receive the plunger in its upper position and a valve to control the discharge of the oil from the outer member.

8. In a fluid receiving valve, the combination of an outer stationary member provided with an inwardly extending rim and an inwardly projecting pin, of an inner movable member or plunger having an enlarged lower end a longitudinal groove adapted to receive the guide pin whereby said plunger is guided in its movements, and a spring interposed between the rim on the outer member and the enlarged lower portion of the plunger to move the plunger to normal position, said plunger being formed with a shoulder at the lower end of said groove which shoulder is adapted to be engaged by the pin to secure the plunger in its upper position.

9. The combination of hollow interior and exterior members, one within the other, one of said members having an internal flange and the other an external ridge, a compression coil spring between the flange and ridge, one of said members having a longitudinal groove and a circumferential shoulder at one end of the groove, a projection on the other member slidable in said groove, said inner member being formed with an oil receiving opening and said outer member being formed with a discharge opening, and a valve to close said discharge opening.

10. The combination of a cylindrical body and a cylindrical plunger therein formed with a filler aperture, a longitudinal groove and a circumferential shoulder, a spring mounted between the plunger and body to hold the plunger in aperture-closing position, a projection on the body slidable in said groove and adapted to engage the shoulder to hold the plunger against the force of the spring, said body being formed with a discharge opening, and a valve to normally close said discharge opening.

11. The combination of a cylindrical body and a cylindrical plunger therein and formed with a filler aperture, a longitudinal groove and a circumferential shoulder, a spring mounted between the plunger and body to hold the plunger in aperture-closing position, a projection on the body slidable in said groove and adapted to engage the shoulder to hold the plunger against the force of the spring, a cap on the upper end of the plunger, a packing ring mounted beneath the cap and adapted to engage the upper end of the body to prevent leakage, said cylindrical body having a discharge opening, and a valve for normally closing said opening.

12. The combination of a body and a plunger therein formed with a filler aperture and a circumferential shoulder, said body having a guide member, a spring mounted between the guide member and the shoulder on the plunger, one of said members being formed with a longitudinal deformation and the other having a portion engaging therewith to prevent the plunger from turning until said deformation has been moved beyond said engaging portion.

JOSEPH HORVATH.

Copies of this patent may be obtained for five cents each, by addressing the "Commissioner of Patents, Washington, D. C."